(12) United States Patent
Vijay et al.

(10) Patent No.: US 8,792,213 B1
(45) Date of Patent: Jul. 29, 2014

(54) TETHERED GIMBAL ON SUSPENSION FOR IMPROVED FLYABILITY

(71) Applicant: Western Digital Technologies, Inc., Irvine, CA (US)

(72) Inventors: Mukund Vijay, San Jose, CA (US); Wing C. Shum, San Mateo, CA (US); Kia Moh Teo, San Jose, CA (US); Yanning Liu, San Ramon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/772,298

(22) Filed: Feb. 20, 2013

(51) Int. Cl.
*G11B 5/39* (2006.01)

(52) U.S. Cl.
USPC ....................................................... 360/245.3

(58) Field of Classification Search
USPC ....................................................... 360/245.3
See application file for complete search history.

(56) References Cited

U.S. PATENT DOCUMENTS

| | | | |
|---|---|---|---|
| 5,870,258 A | 2/1999 | Khan et al. | |
| 5,883,758 A | 3/1999 | Bennin et al. | |
| 5,956,212 A | 9/1999 | Zhu | |
| 5,959,807 A * | 9/1999 | Jurgenson | 360/245.7 |
| 6,249,404 B1 | 6/2001 | Doundakov et al. | |
| 6,459,549 B1 | 10/2002 | Tsuchiya et al. | |
| 6,515,832 B1 | 2/2003 | Girard | |
| 6,965,499 B1 | 11/2005 | Zhang et al. | |
| 6,993,824 B2 | 2/2006 | Childers et al. | |
| 7,002,780 B2 | 2/2006 | Rancour et al. | |
| 7,006,330 B1 * | 2/2006 | Subrahmanyam et al. | 360/234.5 |
| 7,006,331 B1 * | 2/2006 | Subrahmanyam et al. | 360/245.9 |
| 7,113,372 B2 | 9/2006 | Segar et al. | |
| 7,403,357 B1 | 7/2008 | Williams | |
| 7,411,764 B2 | 8/2008 | Yang et al. | |
| 7,525,769 B2 | 4/2009 | Yao et al. | |
| 7,545,605 B2 | 6/2009 | Hagiya et al. | |
| 7,554,773 B2 | 6/2009 | Zhu et al. | |
| 7,567,410 B1 * | 7/2009 | Zhang et al. | 360/245.9 |
| 7,593,190 B1 | 9/2009 | Thornton et al. | |
| 7,663,843 B2 | 2/2010 | Yao | |
| 7,688,553 B1 | 3/2010 | Williams et al. | |
| 7,697,237 B1 | 4/2010 | Danielson | |
| 7,813,082 B2 | 10/2010 | Rice et al. | |
| 8,027,128 B2 | 9/2011 | Muraki et al. | |
| 8,054,585 B2 | 11/2011 | Zeng et al. | |
| 8,130,470 B2 | 3/2012 | Muraki et al. | |
| 8,208,224 B1 | 6/2012 | Teo et al. | |
| 8,488,281 B1 | 7/2013 | Pan | |
| 8,605,389 B1 | 12/2013 | Pan et al. | |
| 2004/0226164 A1 * | 11/2004 | Girard | 29/603.03 |
| 2004/0246625 A1 | 12/2004 | Tsuchida et al. | |
| 2005/0047019 A1 * | 3/2005 | Childers et al. | 360/244.3 |

(Continued)

*Primary Examiner* — Mark Blouin

(57) ABSTRACT

A suspension assembly used in magnetic disk drives includes a load beam and a gimbal assembly coupled to an end of the load beam. The gimbal assembly includes a support having a left outrigger and a right outrigger, first tethers or connectors disposed along the left outrigger, second tethers or connectors disposed along the right outrigger, and a flexible circuit assembly that includes a left electrical trace and a right electrical trace. The flexible circuit assembly is coupled to the support through the first tethers or connectors that couple the left electrical trace to the left outrigger and the second tethers or connectors that couple the right electrical trace to the right outrigger. The first and second tethers or connectors are made of stainless steel with a polyimide coating and there are three first tethers or connectors and three second tethers or connectors.

18 Claims, 5 Drawing Sheets

(56) References Cited

U.S. PATENT DOCUMENTS

| | | |
|---|---|---|
| 2005/0117257 A1 | 6/2005 | Thaveeprungsriporn et al. |
| 2006/0262456 A1 | 11/2006 | Wang et al. |
| 2007/0263325 A1 | 11/2007 | Hanya et al. |
| 2008/0030900 A1 | 2/2008 | Zeng et al. |
| 2008/0144223 A1 | 6/2008 | Muraki et al. |
| 2008/0144225 A1 | 6/2008 | Yao et al. |
| 2008/0180850 A1 | 7/2008 | Rice et al. |
| 2009/0080116 A1 | 3/2009 | Takahashi et al. |

* cited by examiner

TETHERED GIMBAL ON SUSPENSION FOR IMPROVED FLYABILITY

FIELD

The present disclosure relates generally to suspension assemblies used in magnetic disk drives, and more particularly, to tethered gimbal on suspension assemblies used for improved flyability in magnetic disk drives.

BACKGROUND

Magnetic disk drives are used to store and retrieve data in many electronic devices including computers, televisions, video recorders, servers, digital recorders, etc. A typical magnetic disk drive includes a head having a slider and a transducer with a read and write element that is in very close proximity to a surface of a rotatable magnetic disk. As the magnetic disk rotates beneath the head, a thin air bearing is formed between the surface of the magnetic disk and an air bearing surface of the slider. The read and write elements of the head are alternatively used to read and write data while a suspension assembly positions the head along magnetic tracks on the magnetic disk. The magnetic tracks on the magnetic disks are typically concentric circular regions on the magnetic disks, onto which data can be stored by writing to it and retrieved by reading from it.

As the magnetic disk rotates beneath the head, a head gimbal assembly located on the suspension assembly is used to position and orient the head at the correct height above the magnetic disk while in flight. The suspension assembly includes a load beam and the gimbal assembly that attaches the head to the load beam. The gimbal assembly includes a flexible circuit that is used to deliver electrical signals and power to the head and other electronics located on the end of the suspension assembly. The flexible circuit is split into a left electrical trace that and a right electrical trace that follow a left outrigger and a right outrigger. The left and right outriggers are used to support the flexible circuit and head and to attach the flexible circuit and head to the load beam. Conventional magnetic disk drives use a single-tether gimbal assembly wherein the flexible circuit assembly is connected to the outriggers by attaching the left electrical trace to the left outrigger at a single point and by attaching the right electrical trace to the right outrigger at another single point.

During operation of the magnetic disk drive, the magnetic disk is made to rotate at very high revolutions per minute (rpm) that can be well in excess of 10,000 rpms. At these very high speeds the suspension assembly can be subject to forces and resonances that can significantly impact the gimbal assembly as well as the entire magnetic disk drive. Force example, these forces can cause the flexible circuit to distort or solder bonds to fail, or both. Further, if a flexible circuit is sufficiently distorted then a large enough pitch static angle can be created that changes the orientation of the head. These forces and resonances can make the gimbal assembly unstable and sensitive to head disk interface forces. These sensitivities can cause the magnetic disk drive to be unreliable, slow and can reduce the lifetime of the magnetic disk drive.

As magnetic disk drive technology advances, acceptable engineering tolerances are made more stringent and operating conditions become more severe. For example, as magnetic disk drive technology advances magnetic disk drives are designed to operate at higher and higher speeds. At these higher speeds, components within the magnetic disk drive are subjected to new forces and different resonances which were not present before at lower speeds. Further as magnetic disk drives evolve and tolerances become tighter, forces and resonances present within magnetic disk drives that could once be ignored because they were small, are no longer small and can no longer be ignored. The single-tether gimbal assembly, which has been used in conventional magnetic disk drives, worked well with older technology magnetic disk drives were certain resonances and forces were not a concern. However, with new magnetic disk drives operating under tighter tolerances than in the past, magnetic disk drives that employ conventional single-tether gimbal assembly experience significant resonances and forces resulting from the head disk interface which is impacting the performance and reliability of the magnetic disk drive Therefore, what is needed is a system that reduces the sensitivity of the magnetic disk drive to forces and resonances resulting from the head disk interface which has direct impact on the long-term reliability of the magnetic disk drives.

SUMMARY

Several aspects of the present invention will be described more fully hereinafter with reference to various embodiments of apparatuses related to suspension assemblies that further include gimbal assemblies and which are used in magnetic disk drives.

One aspect of a suspension assembly used in magnetic disk drives includes a load beam and a gimbal assembly coupled to an end of the load beam. The gimbal assembly includes a support having a first outrigger and a second outrigger, a first plurality of tethers disposed along the first outrigger, a second plurality of tethers disposed along the second outrigger, and a flexible circuit assembly that includes a first electrical trace and a second electrical trace. The flexible circuit assembly is coupled to the support through the first plurality of tethers that couple the first electrical trace to the first outrigger and the second plurality of tethers that couple the second electrical trace to the second outrigger.

Another aspect of a suspension assembly used in magnetic disk drives includes a load beam and a gimbal assembly coupled to an end of the load beam. The gimbal assembly includes a support having a first outrigger and a second outrigger, a first plurality of connectors disposed along the first outrigger, a second plurality of connectors disposed along the second outrigger, and a flexible circuit assembly that includes a first electrical trace and a second electrical trace. The flexible circuit assembly is connected to the support through the first plurality of connectors that couple the first electrical trace to the first outrigger and the second plurality of connectors that couple the second electrical trace to the second outrigger. In some aspects, the number of first connectors is three and the number of second connectors is also three.

Another aspect of a suspension assembly for use in a magnetic disk drive includes a load beam, a gimbal assembly coupled to an end of the load beam; and a means for securing a flexible circuit assembly to the gimbal assembly. The magnetic disk drive has a resonance signature that is free of resonance modes in a predetermined frequency range.

It will be understood that other aspects of the present invention will become readily apparent to those skilled in the art from the following disclosure, wherein it is shown and described only several embodiments of the invention by way of illustration. As will be realized by those skilled in the art, the present invention is capable of other and different embodiments and its several details are capable of modification in various other respects, all without departing from the spirit and scope of the invention. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
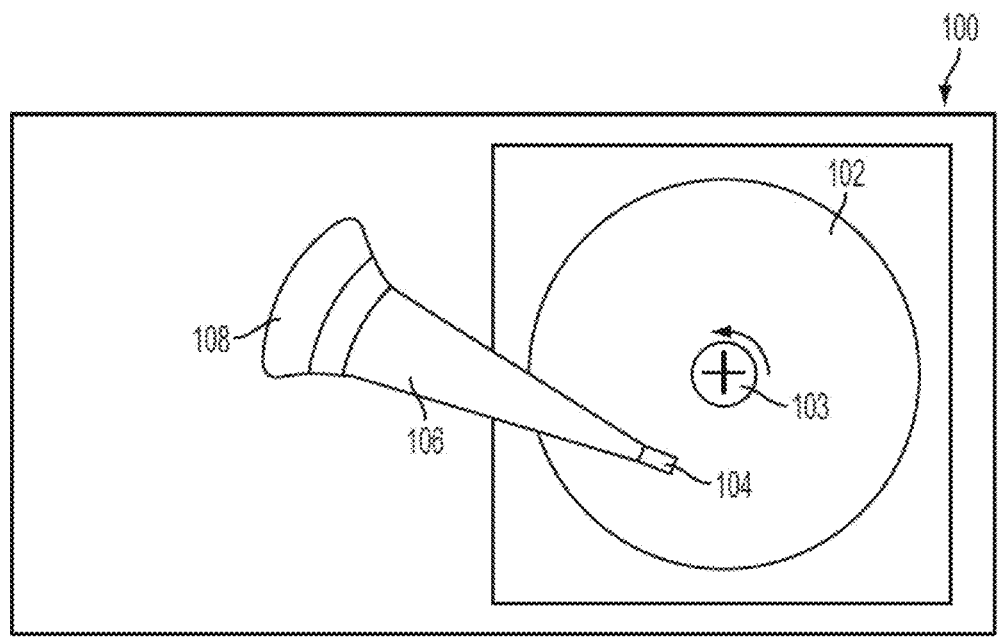
FIG. 1 is a conceptual view an exemplary embodiment of a magnetic disk drive that incorporates a suspension assembly.

The detailed description is intended to provide a description of various exemplary embodiments of the present invention and is not intended to represent the only embodiments in which the invention may be practiced. The term "exemplary" used throughout this disclosure means "serving as an example, instance, or illustration," and should not necessarily be construed as preferred or advantageous over other embodiments. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Various aspects of the present invention may be described with reference to certain shapes and geometries. Any reference to a component having a particular shape or geometry, however, should not be construed as limited to the precise shape illustrated or described, but shall include deviations that result, for example, from manufacturing techniques and/or tolerances. By way of example, a component, or any part of a component, may be illustrated or described as rectangular, but in practice may have rounded or curved features due to manufacturing techniques and/or tolerances. Accordingly, the components illustrated in the drawings are schematic in nature and their shapes are not intended to illustrate the precise shape of the component, and therefore, not intended to limit the scope of the present invention.

In the following detailed description, various aspects of the present invention will be presented in the context of stabilizing a suspension assembly with a gimbal used in magnetic disk drives. While these inventive aspects may be well suited for this application, those skilled in the art will realize that such aspects may be extended to other applications. Accordingly, any reference to suspension assemblies with a gimbal in a magnetic disk drive is intended only to illustrate the various aspects of the present invention, with the understanding that such aspects may have a wide range of applications.

FIG. 1 is a conceptual view of an exemplary magnetic disk drive. The magnetic disk drive 100 is shown with a rotatable magnetic disk 102. The magnetic disk 102 may be rotated on a spindle 103 by a disk drive motor (not shown) located under the magnetic disk 102. A head 104, which can be a perpendicular magnetic recording (PMR) head or lateral magnetic recording (LMR) head, may be used to read and write information by detecting and modifying the magnetic polarization of the recording layer on the disk's surface. The head 104 is generally integrally formed with a carrier or slider (not shown). The function of the slider is to support the head 104 and any electrical connections between the head 104 and the rest of the magnetic disk drive 100. The slider is mounted to a positioner arm 106 which may be used to move the head 104 on an arc across the rotating magnetic disk 102, thereby allowing the head 104 to access the entire surface of the magnetic disk 102. The positioner arm 106 comprises a head gimbal assembly (HGA), which includes a load beam and a gimbal disposed on the end of the load beam, and an actuator unit 108, as described in further detail with reference to FIGS. 4A-4B. The positioner arm 106 may be moved using a voice coil actuator, which is part of the actuator 108, or by some other suitable means.

The slider is aerodynamically designed to fly above the magnetic disk 102 by virtue of an air bearing created between the surface of the slider and the rotating magnetic disk 102. This surface of the slider is referred to as an air bearing surface (ABS). The ABS is the portion of the slider surface which is closest to the rotating magnetic disk 102, which is typically the head 104. In order to maximize the efficiency of the head 104, the sensing elements (i.e., the read and write heads) are designed to have precise dimensional relationships to each other. In addition, the distance between the ABS and the rotating magnetic disk 102 is tightly controlled. The dimension that relates to the write function is known as the throat height and the dimension that relates to the read function is known as the stripe height. Both the stripe height and the throat height are controlled by a lapping process.

The HGA is used to properly orientate the slider at the correct height above the rotating magnetic disk 102 while in flight. The HGA includes the head 104 and a suspension that further includes a load beam and a gimbal assembly that attaches the head 104 to the load beam.

Figures 2A, 2B:
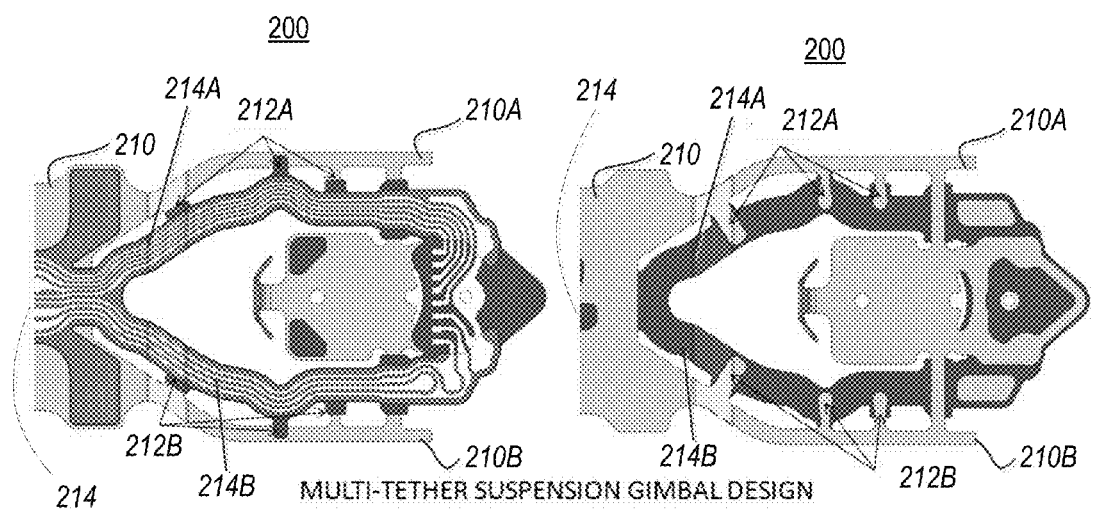
FIG. 2A is a cross-section top view of an exemplary embodiment of a distal end of a gimbal assembly 200.
FIG. 2B is a cross-section bottom view of an exemplary embodiment of a distal end of a gimbal assembly 200.

FIGS. 2A and 2B are top and bottom cross-section views, respectively, of an exemplary embodiment of a distal end of a gimbal assembly 200. The gimbal assembly 200, which is coupled to an end of the load beam, includes a support 210 having a left outrigger 210A and a right outrigger 210B. The left outrigger 210A has a first set of tethers 212A (three shown) attached to it and the right outrigger has a second set of tethers 212B (three shown) attached to it. The gimbal assembly 200 also includes a flexible circuit assembly 214 that splits up into a left electrical trace 214A and a right electrical trace 214B. The left electrical trace 214A follows the path of the left outrigger 210A and is coupled to the left outrigger 210A with the first set of tethers 212A. Similarly, the right electrical trace 214B follows the path of the right outrigger 210B and is coupled to the right outrigger 210B with the second set of tethers 212B. The first set of tethers 212A and the second set of tethers 212B are disposed along the left outrigger 210A and the right outrigger 210B, respectively. The support 210, left outrigger 210A, and right outrigger 210B are can all be made of stainless steel.

In one embodiment, the first set of tethers 212A has three tethers and the second set of tethers 212B also has three tethers. The tethers in the first set of tethers 212A can be equally spaced or unequally spaced. Similarly, the tethers in the second set of tethers 212B can be equally spaced or unequally spaced. In one embodiment, the tethers in the first set of tethers 212A are equally spaced and the tethers in the second set of tethers 212B are also equally spaced. The first set of tethers 212A and the second set of tethers 212B can also be symmetrically disposed with respect to a center line separating the left outrigger 210A and the right outrigger 210B. Alternatively, in another embodiment the tethers in the first set of tethers 212A are not equally spaced and/or the tethers in the second set of tethers 212B are also not equally spaced.

In some embodiments, the number of tethers in the first set of tethers 212A is different than the number of tethers in the second set of tethers 212B. For example, the first set of tethers can have three tethers and the second set of tethers can have two tethers. Alternatively, the first set of tethers can have two tethers and the second set of tethers can have three tethers The tethers can be made of metal such as stainless steel. In some embodiments the tethers include polyimide tethers which overlap the metal or stainless steel tethers. In an alternate embodiment, the tethers are made of polyimide without stainless steel.

The flexible circuit assembly 214 is coupled to the support 210 through three tethers that couple the left electrical trace 214A to the left outrigger 210A and three tethers that couple the right electrical trace 214B to the right outrigger 210A. The flexible circuit assembly 214, the left electrical trace 214A and the right electrical trace 214B can all be made of copper, aluminum, gold, silver, stainless steel or other metal conductor.

According to other embodiments, the tethers are replaced with connectors. In these embodiments, the left outrigger 210A has a first set of connectors attached to it and the right outrigger has a second set of connectors attached to it. The first set of connectors is attached to the left outrigger 210A at the same locations as the first set of tethers 212A and has the same number. Similarly, the second set of connectors are attached to the right outrigger 210B at the same locations as the second set of tethers 212B and have the same number.

The stainless steel tethers or connections are disposed along the left outrigger and right outrigger of the gimbal, which are stainless steel. The stainless steel tethers or connectors tie into the Cu traces of the gimbal structure. The polyimide tethers or connections that overlap the stainless steel tethers or connectors provide mechanical stress distribution to avoid interfacial cracks.

The addition of stainless steel tethers, which couple the left outrigger 210A and right outrigger 210B to the left electrical trace 214A and the right electrical trace 214B, respectively, changes the high-frequency (50-100 kHz) frequency response function (FRF) signature of a suspension gimbal design to improve gimbal dynamics without adversely affecting manufacturing processes. The size of the tethers reduces the amplitude of displacement of the gimbal assembly 200 during both, stable and unstable operation of HGA within a magnetic disk drive. The location of the tethers improve High-frequency FRF for better servo-mechanical control and function without affecting the suspension and HGA manufacturing process.

The stainless steel tethers or connections improve the suspension gimbal design performance specifically in the high-frequency resonance range of 50-100 kHz. This is beneficial in extending long-term reliability by reducing slider wear and improving the ability of the control system to maneuver the magnetic head during normal operation of the magnetic disk drive. The stainless steel tethers or connections also improve flexibility in the air bearing design selection. The ability to reduce HDI sensitivity is another feature that can be leveraged by all suspension designs irrespective of drive form factor.

The multi-tether design has a resonance signature which is free of any major resonance modes in the 40-70 kHz frequency range. This allows for easier sampling frequency selection at a location which is free of resonance modes that are sensitive to HDI contact.

Figure 3:
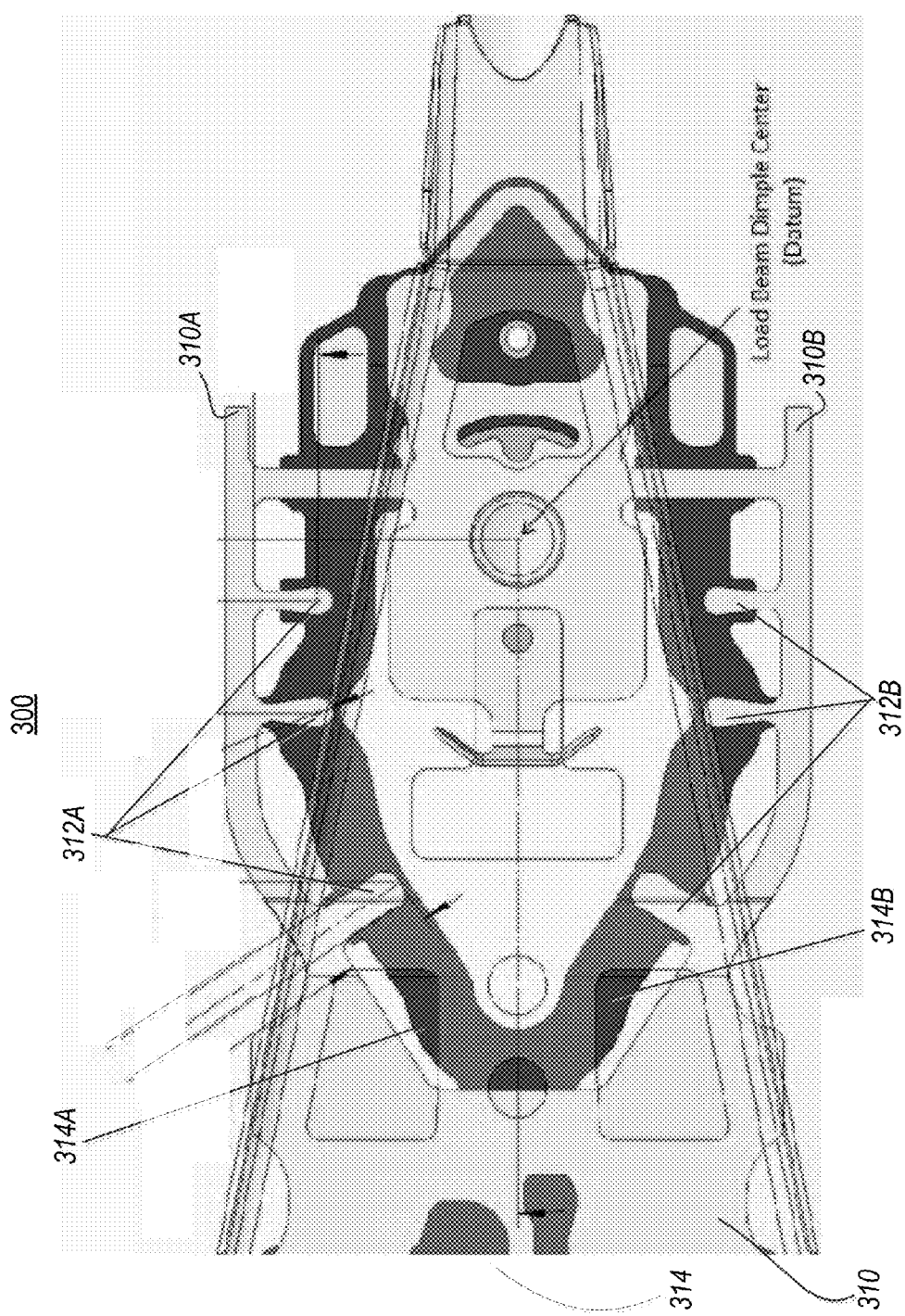
FIG. 3 is an enlarged cross-section top view of an exemplary embodiment of a distal end of a gimbal assembly.

FIG. 3 is an enlarged cross-section top view of an exemplary embodiment of a distal end of a gimbal assembly 300. The gimbal assembly 300, which is coupled to an end of the load beam, includes a support 310 having a left outrigger 310A and a right outrigger 310B. The left outrigger 310A has a first set of tethers or connectors 312A (three shown) attached to it and the right outrigger has a second set of tethers or connectors 312B (three shown) attached to it. The gimbal assembly 300 also includes a flexible circuit assembly 314 that splits up into a left electrical trace 314A and a right electrical trace 314B. The left electrical trace 314A follows the path of the left outrigger 310A and is coupled to the left outrigger 310A with the first set of tethers or connectors 312A. Similarly, the right electrical trace 314B follows the path of the right outrigger 310B and is coupled to the right outrigger 310B with the second set of tethers or connectors 312B. The first set of tethers or connectors 312A and the second set of tethers 312B are disposed along the left outrigger 310A and the right outrigger 310B, respectively.

In the embodiment illustrated in FIG. 3, the three tethers or connectors in the first set of tethers or connectors 312A are not equally spaced. The spacing between the two tethers or connectors closer to the end of the left outrigger 310A is less than the spacing between the two tethers or connectors closer to the other end. Similarly, the three tethers or connectors in the second set of tethers or connectors 312B are not equally spaced. The spacing between the two tethers or connectors closer to the end of the right outrigger 310A is less than the spacing between the two tethers or connectors closer to the other end. In this embodiment the first set of tethers or connectors 312A and the second set of tethers or connectors 312B are disposed symmetrically with respect to a line running down the center of the left outrigger 310A and the right outrigger 310B. The support 310, left outrigger 310A, and right outrigger 310B are can all be made of stainless steel.

Figure 4A:
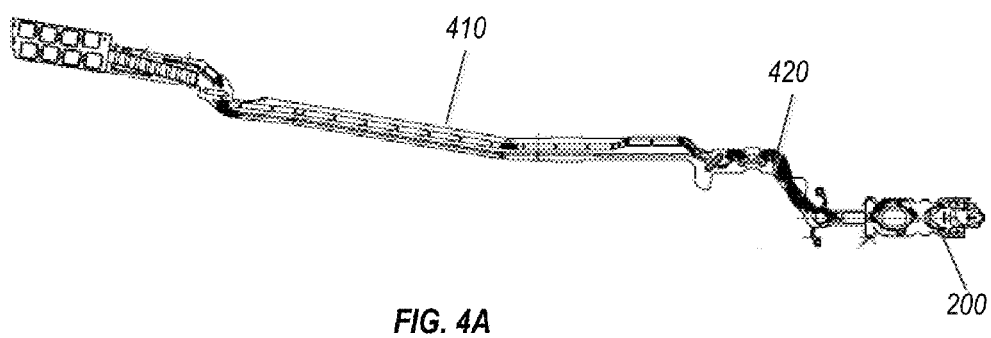
FIGS. 4A and 4B are plan views of a flexure sub-assembly.
Figure 4B:
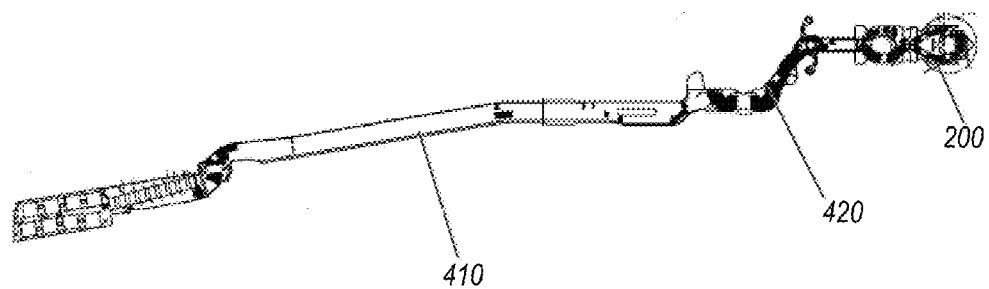

FIG. 4A is a plan view of a flexure sub-assembly 400 as viewed from the side of the magnetic disk 102. Flexure sub-assembly 400 is used to fabricate the suspension assembly, which is used in the magnetic disk drive 100. FIG. 4B is a plan views of a flexure sub-assembly 400 as viewed from the opposite side of the magnetic disk 102. The flexure sub-assembly 400 includes a thin metal support 410 and electrical traces 420 connected to gimbal assembly 200. The flexure sub-assembly 400 further includes a load beam, a hinge, and a mount plate, which are not illustrated in FIGS. 4A-4B. The mount plate includes a swag spud (not shown) formed thereon and is fixed to an actuator (not shown) by swaging. The hinge is used to couple the load beam to the mount plate and to press the load beam onto the magnetic disk 102. The gimbal assembly 200 is spot-welded to the load beam and the mount plate at several weld spots. A terminal is formed at an end portion of the flexure sub-assembly 400 and is used to provide electrical connections to the gimbal assembly 200 and the head 104, which is mounted on the gimbal assembly 200.

The gimbal assembly 200 can be a layered structure that includes a thin metal support, electrical traces, and an insulating layer to keep the electrical traces from contacting the metal support, as described in further detail with reference to FIGS. 5A-5D. The head 104 is electrically connected to the electrical traces during assembly by connecting bonding pads of the head's 104 transducer to corresponding termination pads of the electrical traces on the gimbal assembly 200, for example by soldering.

FIGS. 5A-5D are illustrations showing gimbal assembly 200 broken down according to different layers laminated in order of laminating toward the surface of the magnetic disk 102.

Figures 5A, 5B, 5C, 5D:
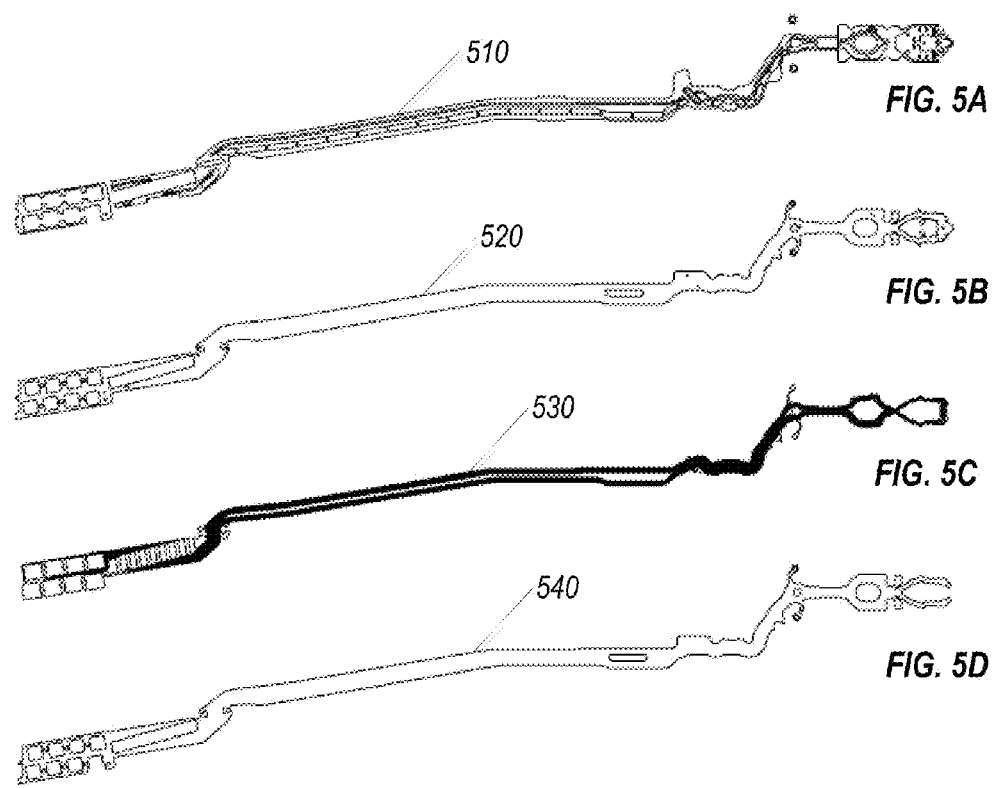
FIGS. 5A-5D are illustrations showing the structure of a gimbal assembly.

FIG. 5A is a plan view showing a metal layer 510 made of stainless steel. The metal layer 510 can be stamped into a predetermined shape. Although stainless steel is used in one embodiment, metal layer 510 can be made of other materials such as, for example, materials exhibiting hard spring characteristics including but not limited to titanium, copper, beryllium, or other like materials. The thickness of the stainless steel metal layer 510 is 0.018±0.0015 mm.

FIG. 5B shows an insulating or dielectric layer 520 formed of polyimide for insulating the metal layer 510 from the electrical wiring layer 530 illustrated in FIG. 5C. The thickness of the polyimide layer 520 is 0.01±0.002 mm.

FIG. 5C shows an electrical wiring layer 530 made of copper and formed over the insulating or dielectric layer 520 illustrated in FIG. 5B. The thickness of the copper electrical wiring layer 530 is 0.01±0.002 mm. The electrical wiring layer 530 provides a path for electric signals to the head 104. In one embodiment, the electrical wiring layer 530 is made of six copper layers that are attached to lead pads formed at each end of the electrical wiring layer 530. A head 104, along with other devices such as heaters, are connected to a slider pad formed on a side face of the head 104, and one of the lead pads is connected to the slider pad.

FIG. 5D shows a cover layer 540 formed over the copper electrical wiring layer 530 illustrated in FIG. 5C. The thickness of the cover layer 540 is 0.004±0.002 mm. The cover layer 540 can be formed of polyimide and is used to protect the surface of the electrical wiring layer 530. The cover layer 540 can include limit areas that are laminated and are used to adjust the head 104 and/or slider.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A suspension assembly for use in a magnetic disk drive, the suspension assembly comprising:
   a load beam; and
   a gimbal assembly coupled to an end of the load beam, the gimbal assembly comprising:
      a support comprising a first outrigger and a second outrigger;
      a first plurality of tethers disposed along the first outrigger and a second plurality of tethers disposed along the second outrigger;
      a flexible circuit assembly comprising a first electrical trace and a second electrical trace;
      wherein the flexible circuit assembly is coupled to the support through the first plurality of tethers that couple the first electrical trace to the first outrigger and the second plurality of tethers that couple the second electrical trace to the second outrigger.

2. The suspension assembly of claim 1 wherein the first plurality of tethers and the second plurality of tethers comprise stainless steel.

3. The suspension assembly of claim 2 further comprising polyimide tethers that overlap the first plurality of tethers and the second plurality of tethers.

4. The suspension assembly of claim 1 further comprising polyimide tethers that overlap the first plurality of tethers and the second plurality of tethers.

5. The suspension assembly of claim 1 wherein the flexible circuit assembly is coupled to the support through three tethers that couple the first electrical trace to the first outrigger and three tethers that couple the second electrical trace to the second outrigger.

6. The suspension assembly of claim 5 wherein the first plurality of tethers and the second plurality of tethers comprise stainless steel.

7. The suspension assembly of claim 6 further comprising polyimide tethers that overlap the first plurality of tethers and the second plurality of tethers.

8. The suspension assembly of claim 1 wherein the number of first plurality of tethers is the same as the number of second plurality of tethers.

9. The suspension assembly of claim 8 wherein the first plurality of tethers and the second plurality of tethers are symmetrically disposed along the first electrical trace and the second electrical trace.

10. The suspension assembly of claim 1 wherein the first electrical trace and the second electrical trace comprise copper.

11. A suspension assembly for use in a magnetic disk drive, the suspension assembly comprising:
    a load beam; and
    a gimbal assembly coupled to an end of the load beam, the gimbal assembly comprising:
       a support comprising a first outrigger and a second outrigger;
       a first plurality of connectors disposed along the first outrigger and a second plurality of connectors disposed along the second outrigger;
       a flexible circuit assembly comprising a first electrical trace and a second electrical trace;
       wherein the flexible circuit assembly is connected to the support through the first plurality of connectors that connect the first electrical trace to the first outrigger and the second plurality of connectors that connect the second electrical trace to the second outrigger.

12. The suspension assembly of claim 11 wherein the flexible circuit assembly is connected to the support through three connectors that connect the first electrical trace to the first outrigger and three connectors that connect the second electrical trace to the second outrigger.

13. The suspension assembly of claim 12 wherein the first plurality of connectors and the second plurality of connectors comprise stainless steel.

14. The suspension assembly of claim 13 further comprising polyimide connectors that overlap the first plurality of connectors and the second plurality of connectors.

15. The suspension assembly of claim 11 further comprising polyimide connectors that overlap the first plurality of connectors and the second plurality of connectors.

16. A suspension assembly for use in a magnetic disk drive, comprising:
   a load beam;
   a gimbal assembly coupled to an end of the load beam; and
   a means for securing a flexible circuit assembly to the gimbal assembly;
   wherein the magnetic disk drive has a resonance signature that is free of resonance modes in a predetermined frequency range.

17. The suspension assembly of claim 1,
   wherein first electrical trace contacts the first plurality of tethers; and
   wherein the second electrical trace contacts the second plurality of tethers.

18. The suspension assembly of claim 11,
   wherein first electrical trace contacts the first plurality of connectors; and
   wherein the second electrical trace contacts the second plurality of connectors.

* * * * *